United States Patent [19]

Hashizume

[11] Patent Number: 4,622,073
[45] Date of Patent: Nov. 11, 1986

[54] METAL POWDER PIGMENT

[75] Inventor: Yoshiki Hashizume, Kashiwara, Japan

[73] Assignee: Toyo Aluminium Kabushiki Kaisha, Osaka, Japan

[21] Appl. No.: 677,016

[22] Filed: Nov. 30, 1984

[30] Foreign Application Priority Data

Dec. 6, 1983 [JP] Japan .................. 58-230199
Nov. 2, 1984 [JP] Japan .................. 59-232086
Nov. 2, 1984 [JP] Japan .................. 59-232087

[51] Int. Cl.$^4$ ............................ C04B 14/34
[52] U.S. Cl. .................. 106/290; 106/299; 106/308 Q; 428/403
[58] Field of Search ........... 106/290, 299, 308 Q; 428/405, 403

[56] References Cited

U.S. PATENT DOCUMENTS 3,682,688 8/1972 Hughes et al. .............. 106/299
3,694,475 9/1972 Brook et al. ............... 106/308 Q
4,122,062 10/1978 Monte et al. ............... 106/299

Primary Examiner—Lorenzo B. Hayes
Attorney, Agent, or Firm—Oblon, Fisher, Spivak, McClelland, & Maier

[57] ABSTRACT

A metal powder pigment of this invention is obtained by treating the metal powder with an organic titanate having the general formula:

$$Ti(OR)_2[OC_2H_4N(C_2H_4OH)_2]_2$$

wherein R is alkyl group of 1 to 8 carbon atoms. The treatment of the metal powder with the organic titanate may be carried out in existence of a coupling agent and/or a basic substance. The metal powder pigment treated with the organic titanate and, if desired, the coupling agent and/or the basic substance is useful for coating many types of articles including plastic articles and suitable for application by electrostatic spraying.

22 Claims, 1 Drawing Figure

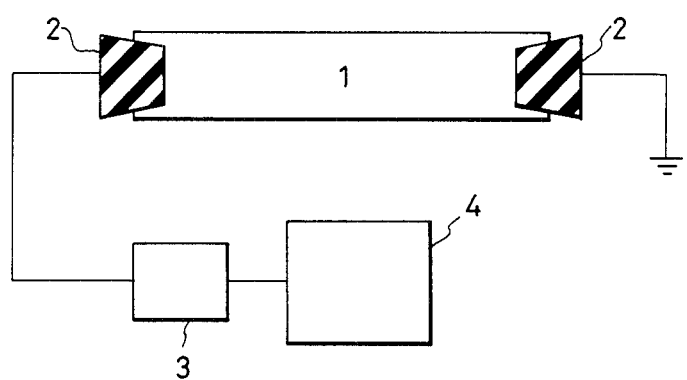

METAL POWDER PIGMENT

This invention relates to metal powder pigments. More particularly, this invention relates to metal powder pigments useful for coating plastic articles and suitable for application by so-called the electrostatic spraying and to a method of treating metal pigments to produce such pigments.

The metallic articles are conventionally obtained by applying a paint in which the metal pigment is incorporated to the articles to be desired to have metallic luster. If the articles to be coated are made of plastics, however, there are many problems. For instance, when the plastic articles are coated with a paint which comprises the metal pigment incorporated in a vehicle capable of drying at low temperature such as acryl lacquer, nitrocellulose lacquer and the like, which vehicle being preferably and suitably used for coating the plastic articles in view of heat-resistant property of the plastic articles, the thus-obtained paint films have the unsatisfactory strength. Therefore, the paint film may be partially or wholly exfoliated by peeling a label and the like sticked thereon. To increase the strength of the paint film by improving the adhesion strength of a vehicle resin on a surface of the metal powder particle, the following methods have been attempted.

(1) method of aging the paint by heating;

(2) method of decreasing amounts of fatty acids and the like adsorbed on the surface of the metal powder particles;

(3) method of modifying the surface of the metal pigment by additives; and (4) method of coating the surface of the metal pigment with resins.

These methods (1) to (3) give unsufficiently the improvement of the adhesion strength stated above and the method (4) rather raises the costs to be unpractical. Thus, any methods proposed are said to be unsatisfactory for solving the above-mentioned problems.

While, if the paint in which the metal pigments are incorporated are applied by the electrostatic spraying which is widely used for coating many types of articles and the advantages of which are familiar to those skilled in the art, there is the problem of being impossible to render the paints adequately non-conductive for successful use in the electrostatic spraying at the applied voltages encountered in such operation because an electrically insulating surface coatings of the metal powder pigment breaks down to link the metal powder particles to each other, then the current coming through the linked metal particles. As the methods for solving such a problem, the following methods have been proposed.

(1) method of insulating the paint in whole for preventing the current from coming through (leaking through) the metal particles so as to charge the paint in all over;

(2) method of admixing the paint with polar solvent for reducing the electrical resistance so as to prevent the current coming through the metal particles;

(3) method of treating the surface of the metal pigment for establishing the electrically insulating surface coating thereon; and (4) method of vigorously stirring or agitating for preventing the link of the metal particles to each other. However, the above-mentioned problem cannot be satisfactorily solved by any of these methods since in the method (1) the operation of replacing the paint involves the risk, in the method (2) the charging toward the paint is not sufficient and in the methods (3) and (4) specific devices and steps are necessary to be unpractical.

It is an object of this invention to provide the metal powder pigments useful for coating the plastic articles and suitable for application by the electrostatic spraying.

An object of this invention is to provide a method for producing such a pigment.

These and other objects will become more apparent from the following descriptions.

Hitherto, it has been known that to establish the electrically insulating surface coating on the metal particles for successful electrostatic spraying, the metal powder pigment is treated with the silane coupling agent. This method has also the demerit that the pigment tends to lose its stability during storage because of the ease agglomeration of the pigment caused by using the silane coupling agent in a large amount, while the use of the silane coupling agent in a small amount is not preferable since the desired result may not be obtained.

According to the use of an organic titanate as the treating agent in this invention, it is possible to provide the metal powder pigment useful for coating the plastic articles and suitable for application by the electrostatic spraying as well as to overcome the demerit caused by using the silane coupling agent as the treating agent.

The metal powder pigment of this invention is treated with the organic titanate to establish the electrically insulating surface coating on the surface of the metal particles.

The organic titanate used as the treating agent in this invention is dialkoxy bis(triethanolamine)titanate having the following general formula:

wherein R is alkyl group having 1 to 8 carbon atoms. The structural formula thereof is as follows:

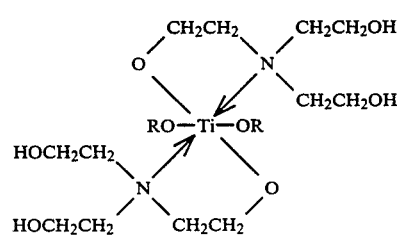

As clear from its structural formula illustrated above, the organic titanate is a chelate compound containing nitrogen atoms having lone pair of electrons. Owing to the strong coordination bonds of the lone pair of electrons with the metal atom, the organic titanate can strongly bind to the metal powder. After that, the titanate is hydrolyzed slowly (not suddenly) onto the surface of the metal powder followed by forming an electrically insulating film of the hydrolyzed titanate on the metal powder. Consequently, the treatment of the metal powder pigment with the organic titanate specified above provides the following advantages.

(a) the adhesion strength of the metal powder pigment to the resin in the paint such as acrylic resin, nitrocellulose, urethane resin, alkyd resin, epoxy resin, vinyl resin and the like is excellent;

(b) the agglomeration of the metal powder pigment is substantially avoided even if long time passed and the loss of the stability of the pigment is not probably found during storage;

(c) the specific devices and steps are not necessary for the treatment of this invention to be practical;

(d) the application by the electrostatic spraying is suitable since the electrically insulating surface coatings on the metal powder pigment is established; and (e) color change or loss of hindering power by the treatment is minimized.

As the organic titanate, dimethoxy bis(triethanolamine) titanate, diethoxy bis(triethanolamine)titanate, dipropoxy bis(triethanolamine)titanate, dibutoxy bis(triethanolamine) titanate, di-2-ethylhexoxy bis(triethanolamine)titanate and the like are exemplified and preferably used. Especially, diisopropoxy bis(triethanolamine)titanate and di-n-butoxy bis(triethanolamine)titanate are more preferable.

For the treatment of the metal powder pigment, the organic titanate is used in an amount of 0.1 to 10 parts by weight, preferably 0.5 to 2 parts by weight based on 100 parts by weight of the metal content in the metal powder pigment to be treated. It is not preferable to use the organic titanate in an amount of less than 0.1 part by weight since the desired results cannot be obtained, while it is also unpreferable to use the organic titanate in an amount of more than 10 parts by weight since the metal powder pigment tends to easily agglomerate so as to deteriorate the stability of the pigment during storage, or the increase in viscosity and the gelation of the paint may be occurred and the bad phenomena such as cratering and lowered water proofness in the paint film may be found.

To improve the treating effect of the metal powder pigment with the organic titanate, it is preferable to use a coupling agent in combination with the organic titanate. By using the coupling agent with the organic titanate to treat the metal powder pigment, the electrically insulating surface coating which does not break down at the extremely high voltages of electrostatic sprayings can be established on the metal powder particles without detracting from the advantages effected by the treatment with the only use of the organic titanate. Moreover, the loss of stability during storage which is the demerit of the treatment with the silane coupling agent only is not recognized.

The coupling agent used in this invention is preferably silane coupling agent and titanate coupling agent having at least one amino group in the molecule. As the silane coupling agent, N-$\beta$-aminoethyl-$\gamma$-aminopropyltrialkoxy silane, N-$\beta$-aminoethyl-$\gamma$-aminopropylalkyldialkoxy silane, $\gamma$-aminopropyltrialkoxy silane and the like are exemplified. As the titanate coupling agent, isopropyl (N,N-dimethylethylamino)titanate, isopropyl tri(N-ethylamino-ethylamino)titanate, isopropyl (4-aminobenzoyl)isostearoyl titanate, isopropyl trianthranil titanate, isopropyl 4-aminobenzenesulfonyl-di(-dodecylbenzenesulfonyl)titanate, isopropyl 4-aminobenzoyl-isostearoyloxyacetate titanate and the like are exemplified. More preferably, N-$\beta$-aminoethyl-$\gamma$-aminopropyltrimethoxy silane, $\gamma$-aminopropyltriethoxy silane, isopropyl tri(N-ethylamino-ethylamino)titanate and isopropyl trianthraniltitanate are exemplified.

For the treatment of the metal powder pigment, it is preferable to use the silane coupling agent in an amount of 0.1 to 1 part by weight and/or the titanium coupling agent in an amount of 0.1 to 5 parts by weight, based on 100 parts by weight of the metal content in the metal powder pigment to be treated. It is not preferable to use the coupling agent in the amount out of the above-mentioned range since the use of the coupling agent in lesser amount does not give the satisfactory treating effect, while the use in much more amount is in fear of bring about the agglomeration of the metal powder.

Furthermore, the treatment of the metal powder pigment according this invention is preferably carried out in coexistence of a basic substance since the basic substance promotes the reaction between the organic titanium and the metal as shown below and as a result the electrically insulating surface coating can be established more surely on the metal powder particles.

The basic substance used in this invention is preferably aminoalcohols having 10 or less carbon atoms, of which illustrative examples are monoethanolamine, diethanolamine, triethanolamine, ethyl monoethanolamine, n-butyl monoethanolamine, dimethylethanolamine, diethylethanolamine, ethyl diethanolamine, n-butyl diethanolamine, 2-amino-2-methyl-1-propanol, triisopropanol amine and the like. Alternatively, the use of the aliphatic amines having 10 or less carbon atoms as the basic substance in this invention is recommendable, of which illustrative examples are monoethylamine, propylamine, butylamine, amylamine, hexylamine, heptylamine, octylamine, nonylamine, decylamine, 2-ethylbutylamine, 2-ethylhexylamine, diethylamine, dipropylamine, dibutylamine, diamylamine, ethylenediamine, propylenediamine, triethylamine, diethylenetriamine, tetraethylene pentamine and the like. The selection of the basic substance having more than 10 carbon atoms such as laurylamine should be avoided since the attainment of the desired treating effect is possibly impossible. Especially, monoethanolamine, triethanolamine, 2-amino-2-methyl-1-propanol, triethylamine and 2-ethylhexylamine are more preferable.

In case of the treatment of the metal powder pigment in coexistence of the basic substance, the basic substance is preferably used in an amount of 0.1 to 5 parts by weight, more preferably 0.5 to 1 part by weight based on 100 parts by weight of the metal content in the metal powder pigment to be treated. The use of the basic substance in an amount out of the above-mentioned range is not preferable since the sufficient treating effect cannot be obtained.

The metal powder pigment to be treated according to this invention is not limited, but the treatment of this invention is applicable to the metal powder pigment including leafing or non-leafing aluminum pigments and pigments of other metals such as copper, iron, chromium, nickel, tin, lead and zinc flake powders as well as flake powders of various alloys of these metals. Stated generally, flake metal powders are commonly made by grinding finely divided metal powder, such as shredded foil or atomized powder, into the desired flake form either under dry conditions as in air or inert gas, or wet conditions as in an aliphatic, cycloaliphatic or aromatic hydrocarbon or a mixture thereof like mineral spirits. In both wet and dry grinding operations, it is conventional to perform the grinding or milling step in the presence of a small amount of a grinding agent such as fatty acid. The grinding agent acts to protect the metal particles during grinding as well as to coat the particles with a thin film. As will be appreciated from the foregoing, the metal powder treated with the method of this invention, having already been subjected to flake-forming operation as described above, ordinarily has a pre-existing surface coating of grinding agent residue. The method of this invention is, as stated above, broadly applicable to the treatment of such flake powders, whatever the untreated flake is leafing or non-leafing in character. The product treated with this invention is a metal powder having (i.e. ordinarily in addition to such pre-existing coating) a surface coating of organic titanate.

The manner for treating the metal powder pigment with the organic titanate and, if desired, the coupling agent and/or the basic substance in this invention is not also limited, but these materials are preferably added in a mixing step which is the indispensable step to prepare the metal powder pigments since this manner has no additional step and device to be very practical. That is, it is preferable to dissolve the organic titanate and, if desired, the coupling agent and/or the basic substance into an organic solvent followed by mixing the metal powder with the organic solvent solution, if desired, in the coexistence of a hydrocarbon in a mixer such as a ribbon mixer, a kneader mixer and the like to achieve the treatment of the metal powder. The metal powder is mixed for a period of time sufficient to establish the electrically insulating surface coating on the metal particles. A period of mixing of from 0.5 to 24 hours is sufficient to accomplish this result. The metal powder pigment to be treated with this invention may contain any other additives.

A minor amount of water may, if desired, be added to the powder to catalyze the hydrolysis of the organic titanate so as to make the reaction between the thus hydrolyzed organic titanate and the metal powder proceed smoothly.

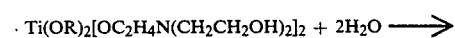  (1)

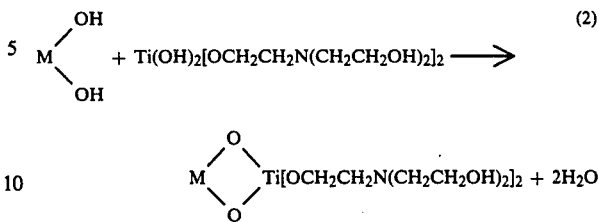

wherein M represents metal atom. But, the addition of water may not be essential to the attainment of the desired results, apparently because sufficient water to effect the hydrolysis of the organic titanate is present in the pigment presumably owing to moisture in the atmosphere or in, on or around the metal powder pigment. If water is added to promote the hydrolysis of the organic titanate, water may be dissolved in the organic solvent prior to adding at least the organic titanate thereinto, or mixed with the organic solvent simultaneously, which is then mixed with the metal powder as described above.

Water if added should be in an amount of 0.05 to 1.5 parts by weight based on 100 parts by weight of the metal content in the metal powder pigment. The addition of water in lesser amount is not preferable since the effect cannot be obtained as intended, while the addition of water in much amount is also unpreferable since water may react the metal powder to agglomerate the metal powder and hydrogen gas may produce to offer the danger such as the expansion of the vessel for the storage of the pigment.

Further, to promote the reaction between the organic titanate and the metal powder, the aging by heating, for example at the temperature of 20° to 80° C. for 1 to 1,000 hours may be carried out after the completion of the mixing step.

The organic solvent in which the organic titanate and so on are added is preferably a hydrophilic organic solvent or a mixture thereof, of which illustrative examples are methyl alcohol, ethyl alcohol, propyl alcohol, butyl alcohol, amyl alcohol, hexyl alcohol, cyclohexanol, 2-ethylbutylalcohol, benzyl alcohol, 1,4-dioxane, acetone, methyl ethyl ketone, diacetone alcohol, ethyleneglycol, methyl cellosolve, methyl cellosolve acetate, ethyl cellosolve, butyl cellosolve, methoxy methoxyethanol, diethyleneglycol, methyl carbitol, ethyl carbitol, butyl carbitol and the like. And the used amount of the above-mentioned solvent is not limited and may depend on the kind of the organic solvent. In the case where the metal powder pigment contains the hydrocarbon such as mineral spirit which may be incorporated during the flake-forming operation as described above, it is preferable to use the organic solvent in an amount enough to dissolve or disperse the additives mentioned above in the hydrocarbon.

The thus-obtained metal powder pigment may be used as a pigment for paint or other coating composition for application by electrostatic spraying and the like.

Now the present invention will be described by the Examples and Comparative Examples.

EXAMPLE 1

1.6 gram of di-n-butoxy bis(triethanolamine)titanate and 0.16 g of deionized water dissolved in 88.7 g of Butyl Cellosolve ® was added to 500 g of non-leafing aluminum paste (1700N manufac. by TOYO ALUMINIUM K.K.) containing 65% of aluminum, and then mixed in a kneader mixer having a capacity of 1 liter for 3 hours to obtain the aluminum pigment.

EXAMPLES 2 TO 9 AND COMPARATIVE EXAMPLES 1 TO 9

The procedure of Example 1 was repeated under the conditions shown in Table 1.

EXAMPLE 10

3.3 gram of di-n-butoxy bis(triethanolamine)titanate, 1.7 g of triethylamine and 0.33 g of deionized water dissolved in 85.0 g of Butyl Cellosolve ® was added to 500 g of non-leafing aluminum paste (1200M manufac. by TOYO ALUMINIUM K.K.) containing 65% of aluminum and then mixed in a kneader mixer having a capacity of 1 liter for 3 hours to obtain the pigment.

EXAMPLES 11 TO 15 AND COMPARATIVE EXAMPLES 10 TO 12

The procedure of Example 10 was repeated under the conditions shown in Table 1 to obtain the pigment.

EXAMPLE 16

3.3 grams of di-n-butoxy bis(triethanolamine)titanate, 1.7 g of N-$\beta$-aminoethyl-$\gamma$-aminopropyl trimethoxy silane and 0.33 g of deionized water dissolved in 85.0 g of isobutylalcohol was added to 500 g of non-leafing aluminum paste (1200M manufac. by TOYO ALUMINIUM K.K.) containing 65% of aluminum, and then mixed in a kneader mixer having a capacity of 1 liter for 3 hours to obtain the pigment.

EXAMPLES 17 TO 21 AND COMPARATIVE EXAMPLES 13 & 14

The procedure of Example 16 was repeated under the conditions shown in Table 1 to obtain the pigment.

TABLE 1

| | metal powder | | organic titanate | | basic substance | | coupling agent | | water | organic solvent | |
|---|---|---|---|---|---|---|---|---|---|---|---|
| | kind | amount (g) | kind | amount (g) | kind | amount (g) | kind | amount (g) | amount (g) | kind | amount (g) |
| Example | | | | | | | | | | | |
| 1 | aluminum paste 1 | 500 | X | 1.6 | — | — | — | — | 0.16 | butyl cellosolve | 88.7 |
| 2 | aluminum paste 1 | " | X | 3.3 | — | — | — | — | 0.33 | butyl cellosolve | 86.3 |
| 3 | aluminum paste 1 | " | X | 6.5 | — | — | — | — | 0.65 | butyl cellosolve | 81.9 |
| 4 | aluminum paste 1 | " | X | 13.0 | — | — | — | — | 1.30 | butyl cellosolve | 72.9 |
| 5 | aluminum paste 1 | " | X | 26.0 | — | — | — | — | 2.60 | butyl cellosolve | 55.0 |
| 6 | aluminum paste 1 | " | X | 6.5 | — | — | — | — | 3.25 | ethyl cellosolve | 79.3 |
| 7 | aluminum paste 2 | " | X | 13.0 | — | — | — | — | 1.30 | butyl carbitol | 72.9 |
| 8 | bronze powder | 1,000 | X | 10.0 | — | — | — | — | 1.00 | ethylene glycol | 250.0 |
| 9 | bronze powder | " | X | 20.0 | — | — | — | — | 2.00 | ethylene glycol | 250.0 |
| Comparative Example | | | | | | | | | | | |
| 1 | aluminum paste 1 | 500 | — | — | — | — | — | — | — | — | — |
| 2 | aluminum paste 1 | " | X | 6.5 | — | — | — | — | 6.50 | butyl cellosolve | 76.1 |
| 3 | bronze powder | 1,000 | — | — | — | — | — | — | — | ethylene glycol | 250.0 |
| 4 | aluminum paste 1 | 500 | — | — | — | — | A | 6.5 | 0.65 | butyl cellosolve | 83.8 |
| 5 | aluminum paste 1 | " | — | — | — | — | A | 13.0 | 1.30 | butyl cellosolve | 76.6 |
| 6 | aluminum paste 1 | " | — | — | — | — | B | 6.5 | 0.65 | butyl cellosolve | 83.8 |
| 7 | aluminum paste 1 | " | — | — | — | — | B | 13.0 | 1.30 | butyl cellosolve | 76.6 |
| 8 | aluminum paste 1 | " | — | — | — | — | C | 6.5 | 0.65 | butyl cellosolve | 83.8 |
| 9 | aluminum paste 1 | " | — | — | — | — | C | 13.0 | 1.30 | butyl cellosolve | 76.6 |
| Example | | | | | | | | | | | |
| 10 | aluminum paste 3 | 500 | X | 3.3 | a | 1.7 | — | — | 0.33 | butyl cellosolve | 85.0 |
| 11 | aluminum paste 3 | " | X | " | b | 1.7 | — | — | 0.33 | butyl cellosolve | " |
| 12 | aluminum paste 3 | " | X | " | c | 1.7 | — | — | 0.33 | ethyl cellosolve | " |
| 13 | aluminum paste 3 | " | X | " | d | 1.7 | — | — | 0.33 | ethyl cellosolve | " |

TABLE 1-continued

| | metal powder | | organic titanate | | basic substance | | coupling agent | | water | organic solvent | |
|---|---|---|---|---|---|---|---|---|---|---|---|
| | kind | amount (g) | kind | amount (g) | kind | amount (g) | kind | amount (g) | amount (g) | kind | amount (g) |
| 14 | aluminum paste 3 | " | Y | " | e | 1.7 | — | — | 0.33 | n-hexyl alcohol | " |
| 15 | aluminum paste 3 | " | X | " | c | 3.3 | — | — | 0.33 | n-butyl alcohol | " |
| Comparative Example | | | | | | | | | | | |
| 10 | aluminum paste 3 | " | — | — | e | 1.7 | — | — | — | isobutyl alcohol | " |
| 11 | aluminum paste 3 | " | — | — | a | 1.7 | — | — | — | n-hexyl alcohol | " |
| 12 | aluminum paste 3 | " | — | — | f | 1.7 | — | — | — | n-butyl alcohol | " |
| Example | | | | | | | | | | | |
| 16 | aluminum paste 3 | 500 | X | 3.3 | — | — | A | 1.7 | 0.33 | isobutyl alcohol | 85.0 |
| 17 | aluminum paste 3 | " | Y | " | — | — | D | 1.7 | " | n-hexyl alcohol | " |
| 18 | aluminum paste 3 | " | X | " | — | — | E | 1.7 | " | n-butyl alcohol | " |
| 19 | aluminum paste 3 | " | X | " | — | — | D | 6.5 | " | n-butyl alcohol | " |
| 20 | aluminum paste 3 | " | X | " | a | 0.66 | D | 0.66 | " | n-butyl alcohol | " |
| 21 | aluminum paste 3 | " | X | " | c | 1.0 | F | 1.0 | " | n-butyl alcohol | " |
| Comparative Example | | | | | | | | | | | |
| 13 | aluminum paste 3 | " | — | — | — | — | D | 3.3 | " | isobutyl alcohol | " |
| 14 | aluminum paste 3 | " | — | — | — | — | D | 13.0 | 1.30 | n-hexyl alcohol | " |

(NOTE)
Metal powder:
aluminum paste 1 ... 1700N containing 65% by weight of aluminum, manufac. by TOYO ALUMINIUM K.K.
aluminum paste 2 ... 7160N containing 65% by weight of aluminum, manufac. by TOYO ALUMINIUM K.K.
aluminum paste 3 ... 1200M containing 65% by weight of aluminum, manufac. by TOYO ALUMINIUM K.K.
bronze powder ... BS-935 containing 99% by weight of bronze, manufac. by Wolstenholme Bronze Powders Ltd.
Organic titanate:
X ... di-n-butoxy bis(triethanolamine)titanate
Y ... di-isopropoxy bis(triethanolamine)titanate
Basic substance:
a ... triethylamine
b ... monoethanolamine
c ... triethanolamine
d ... 2-ethylhexyl amine
e ... 2-amino-2-methyl-1-propanol
f ... laurylamine
Coupling agent:
A ... N—β-aminoethyl-γ-aminopropyltrimethoxy silane
B ... isopropyl tri(dioctylpyrophosphate)titanate
C ... tetra-n-butoxy titanium
D ... isopropyl tri(N—ethylamino-ethylamino)titanate
E ... isopropyl trianthraniltitanate
F ... γ-aminopropyl-triethoxy silane The compositions of the pigments obtained in Examples 1 to 21 and Comparative Examples 1 to 14 were shown in Table 2.

In Table 2, the values of the water content and the solvent content were expressed as those based on 100 parts by weight of the metal content in the metal powder pigment. The water content was determined in accordance with Karl Fischer's method. And the solvent involves the hydrocarbon originally present in the metal powder pigment.

TABLE 2

| | metal content (%) | water content (parts by weight) | solvent content (parts by weight) |
|---|---|---|---|
| Example | | | |
| 1 | 55 | 0.08 | 81 |
| 2 | " | 0.14 | 81 |
| 3 | " | 0.22 | 80 |
| 4 | " | 0.45 | 77 |
| 5 | " | 0.83 | 73 |
| 6 | " | 1.04 | 79 |
| 7 | " | 0.43 | 77 |
| 8 | 78 | 0.15 | 25 |
| 9 | " | 0.24 | 25 |
| Comparative Example | | | |
| 1 | 65 | 0.02 | 54 |
| 2 | 55 | 2.05 | 78 |
| 3 | 79 | 0.04 | 25 |
| 4 | 55 | 0.23 | 80 |
| 5 | " | 0.45 | 77 |
| 6 | " | 0.24 | 80 |
| 7 | " | 0.42 | 77 |
| 8 | " | 0.24 | 80 |
| 9 | " | 0.44 | 77 |
| Example | | | |

TABLE 2-continued

| | metal content (%) | water content (parts by weight) | solvent content (parts by weight) |
|---|---|---|---|
| 10 | 55 | 0.12 | 80 |
| 11 | " | 0.13 | " |
| 12 | " | 0.13 | " |
| 13 | " | 0.11 | " |
| 14 | " | 0.12 | " |
| 15 | " | 0.14 | " |
| Comparative Example | | | |
| 10 | " | 0.02 | " |
| 11 | " | 0.02 | " |
| 12 | " | 0.03 | " |
| Example | | | |
| 16 | " | 0.14 | " |
| 17 | " | 0.13 | " |
| 18 | " | 0.13 | " |
| 19 | " | 0.12 | " |
| 20 | " | 0.13 | " |
| 21 | " | 0.14 | " |
| Comparative Example | | | |
| 13 | " | 0.12 | " |
| 14 | 54 | 0.44 | " |

EXAMPLE 22

The following experimental tests were carried out to show the effectiveness of the pigment of this invention.

Test 1: Adhesion strength

Firstly, the paint was prepared by mixing 35 parts by weight of acryl lacquer (Acrydic ® A-165 manufac. by DAINIPPON INK AND CHEMICALS, INC., NV 50%), 5 parts by weight (on the basis of the metal content) of the metal powder pigment obtained in each of Examples and Comparative Examples and 60 parts by weight of a mixed solvent comprising 40 parts by volume of ethylacetate, 30 parts by volume of Ethyl Cellosolve ® and 30 parts by volume of cyclohexane.

The paint prepared above was sprayed on a plate of acrylonitrile-butadiene-styrene resin and dried at the temperature of 50° C. for 20 minutes to form the paint film of the thickness of about 10 microns.

Onto the paint film a cut of cellophane adhesive tape (CT-24 manufac. by NICHIBAN COMPANY, LIMITED) was forcedly sticked. At once, the cut of tape was peeled from the paint film to observe the degree how large the paint film was exfoliated by the forced peeling and to evaluate in accordance with the following grade while comparing with the sticked area of the tape as the standard.

Point 1: the exfoliated area is more than 90%;
2: the exfoliated area is about 50 to 90%;
3: the exfoliated area is about 10 to 50%;
4: the exfoliated area is not more than 10%; and
5: the exfoliation was not substantially found.

Test 2: breakdown voltage

Firstly, the paint was prepared by mixing 80 parts by weight of acryl varnish (Acrydic ® 47-712 manufac. by DAINIPPON INK AND CHEMICALS, INC., NV 50%), 20 parts by weight of melamine varnish (Super Beckamine ® J-820 manufac. by same maker, NV 60%), 25 parts by weight of n-butyl alcohol and 3.75 parts by weight (on the basis of the metal content) of the metal powder pigment.

The breakdown voltage of the above-prepared paint was determined using the apparatus illustrated in FIG. 1 following the manner described below.

After introducing the paint in the glass tube 1 having a 10 mm inside-diameter and a 120 mm length and sealing with rubber plugs 2, constant voltage of 5 kV was applied from a suitable high-voltage DC source 4 and maintained for one minute while checking the absence of linkage as determined by the microammeter 3 readings. A succession of constant voltages, each 5 kV higher than the preceding voltage were then applied for one minute. The maximum value of voltage that can be maintained for one minute without linkage as determined by the microammeter readings was judged as the breakdown voltage.

Test 3: agglomeration

The proportion of the metal powder not passing through 350-mesh screen was determined in accordance with JIS K5910-5.9 immediately after the preparation of the metal powder pigment and after one month storage at 50° C.

The test results are shown in Table 3.

TABLE 3

| | Test 1 | Test 2 (kV) | Test 3 immediately (%) | Test 3 after storage (%) |
|---|---|---|---|---|
| Example | | | | |
| 1 | 4 | 35 | 0.03 | 0.04 |
| 2 | 5 | 40 | 0.03 | 0.03 |
| 3 | 5 | 55 | 0.03 | 0.05 |
| 4 | 5 | more than 60 | 0.04 | 0.04 |
| 5 | 5 | more than 60 | 0.04 | 0.07 |
| 6 | 5 | 50 | 0.06 | 0.06 |
| 7 | 5 | more than 60 | 0.02 | 0.03 |
| 8 | 5 | 50 | 0.09 | 0.12 |
| 9 | 5 | more than 60 | 0.09 | 0.13 |
| Comparative Example | | | | |
| 1 | 1 | 15 | 0.04 | 0.04 |
| 2 | 5 | more than 60 | 0.04 | 1.65 |
| 3 | 1 | 15 | 0.05 | 0.06 |
| 4 | 3 | 15 | 0.90 | 16.44 |
| 5 | 3 | 25 | 0.90 | 16.44 |
| 6 | 1 | 15 | 0.04 | 0.05 |
| 7 | 1 | 15 | 0.03 | 0.04 |
| 8 | 2 | 15 | 0.04 | 0.14 |
| 9 | 2 | 20 | 0.03 | 0.21 |
| Example | | | | |
| 10 | 5 | 55 | 0.01 | 0.01 |
| 11 | 5 | more than 60 | " | " |
| 12 | 5 | " | " | " |
| 13 | 4 | " | " | " |
| 14 | 5 | " | " | " |
| 15 | 5 | " | " | " |
| Comparative Example | | | | |
| 10 | 3 | 25 | " | 0.02 |
| 11 | 2 | 20 | " | 0.01 |
| 12 | 1 | 15 | " | " |
| Example | | | | |
| 16 | 5 | more than 60 | " | " |
| 17 | 5 | " | " | " |
| 18 | 5 | " | " | " |
| 19 | 5 | " | " | " |
| 20 | 5 | 55 | " | " |
| 21 | 5 | more than 60 | " | " |
| Comparative Example | | | | |
| 13 | 3 | 20 | " | " |

TABLE 3-continued

| | Test 1 | Test 2 (kV) | Test 3 immediately (%) | Test 3 after storage (%) |
|---|---|---|---|---|
| 14 | 4 | 40 | 0.15 | 3.56 |

EXAMPLE 23

The paint comprising 80 parts by weight of Acrydic ® 47-712, 20 parts by weight of Super Beckamine ® J-820, 10 parts by weight (on the basis of the metal content) of the metal powder pigment of this invention and 100 parts by weight of a mixed solvent mixing 60 parts by volume of xylene, 25 parts by weight of methyl isobutyl ketone and 15 parts by volume of diacetone alcohol was applied by the use of Turbo Grooved Mini-Bell electrostatic spraying device (manufac. by Ransburg Japan Ltd.)

The results are shown in Table 4.

TABLE 4

| metal powder pigment obtained in | applied voltage 90 kV | applied voltage 110 kV |
|---|---|---|
| Example | | |
| 2 | o | o |
| 3 | o | o |
| 4 | o | o |
| Comparative Example | | |
| 1 | x | x |
| 5 | x | x |

It is to be understood that the invention is not limited to the procedures and embodiments hereinabove specifically set forth but may be carried out in other way without departure from its spirit.

What is claimed is:

1. A metal powder pigment, which comprises a plurality of metal particles, each of which has coated thereon an electrically insulating surface coating formed by contacting said metal particles with an organic titanate of the formula:

$$Ti(OR)_2[OC_2H_4N(C_2H_4OH)_2]_2$$

where R is an alkyl group having 1 to 8 carbon atoms, said contacting resulting in binding of said titanate to said metal particles followed by hydrolyzing said titanate onto the surfaces of said metal particles.

2. The pigment according to claim 1, wherein 0.1 to 10 parts by weight of the organic titanate based on 100 parts by weight of a metal powder in the pigment is used.

3. The pigment according to claim 2, wherein 0.5 to 2 parts by weight of the organic titanate based on 100 parts by weight of the metal powder in the pigment is used.

4. The pigment according to any one of claims 1, 2 or 3, wherein the organic titanate is selected from the group consisting of dimethoxy bis(triethanolamine)titanate, diethoxy bis(triethanolamine)titanate, dipropoxy bis(triethanolamine)titanate, dibutoxy bis(triethanolamine)titanate and di-2-ethylhexoxy bis(triethanolamine)titanate.

5. The pigment according to claim 1 wherein a coupling agent and/or a basic substance is used in combination with the use of the organic titanate.

6. The pigment according to claim 5, wherein the coupling agent is a silane coupling agent or a titanate coupling agent having at least one amino group in the molecule.

7. The pigment according to claim 6, wherein the silane coupling agent is used in an amount of 0.1 to 1 part by weight based on 100 parts by weight of the metal powder in the pigment.

8. The pigment according to claim 7, wherein the silane coupling agent is N-β-aminoethyl-γ-aminopropyl-trialkoxy silane, N-β-aminoethyl-γ-aminopropylalkyldialkoxy silane or γ-aminopropyl-trialkoxy silane.

9. The pigment according to claim 6, wherein the titanate coupling agent is used in an amount of 0.1 to 5 parts by weight based on 100 parts by weight of the metal powder in the pigment.

10. The pigment according to claim 9, wherein the titanate coupling agent is isopropyl (N,N-dimethylethylamino) titanate, isopropyl tri(N-ethylaminoethylamino)titanate, isopropyl (4-aminobenzoyl)isostearoyl titanate, isopropyl trianthranil titanate, isopropyl 4-aminobenzenesulfonyldi(dodecylbenzenesulfonyl)titanate or isopropyl 4-aminobenzoyl isostearoyloxyacetate titanate.

11. The pigment according to claim 5, wherein the basic substance is used in an amount of 0.1 to 5 parts by weight based on 100 parts by weight of the metal powder in the pigment.

12. The pigment according to claim 11, wherein the basic substance is used in an amount of 0.5 to 1 part by weight based on 100 parts by weight of the metal powder in the pigment.

13. The pigment according to claim 11 or 12, wherein the basic substance is aminoalcohol or amine having at most 10 carbon atoms.

14. The pigment according to claim 13, wherein aminoalcohol is monoethanolamine, diethanolamine, triethanolamine, ethyl monoethanolamine, n-butyl monoethanolamine, dimethylethanolamime, diethylethanolamine, ethyl diethanolamine, n-butyl diethanolamine, 2-amino-2-methyl-1-propanol or triisopropanolamine.

15. The pigment according to claim 13, wherein amine is monoehtylamine, propylamine, butylamine, amylamine, hexylamine, heptylamine, octylamine, nonylamine, decylamine, 2-ethylbutylamine, 2-ethylhexylamine, diethylamine, dipropylamine, dibutylamine, diamylamine, ehtylenediamine, propylenediamine, triethylamine, diethylenetriamine or tetraethylenepentamine.

16. A process for preparing a metal powder pigment, which comprises contacting a metal powder with an organic titanate of the formula:

$$Ti(OR)_2[OC_2H_4N(C_2H_4OH)_2]_2$$

wherein R is an alkyl group having 1 to 8 carbon atoms, said contacting resulting in binding of said titanate to the individual particles of the metal powder, followed by hydrolyzing said titanate onto the surfaces of said metal particles.

17. The process according to claim 16 wherein the organic titanate is dissolved in an organic solvent.

18. The process according to claim 16 or 17, wherein the mixing is carried out in coexistence of a coupling agent and/or a basic substance.

19. The process according to claim 18, wherein the coupling agent and/or the basic substance is also dissolved in the organic solvent in which the organic titanate is dissolved.

20. The process according to claim 16, wherein the mixing is carried out in presence of water.

21. The process according to claim 20, wherein water is used in an amount of 0.05 to 1.5 part by weight based on the metal powder.

22. The process according to claim 17 or 19, wherein the organic solvent is a hydrophilic organic solvent or a mixture thereof.

* * * * *